(12) United States Patent
Slack et al.

(10) Patent No.: US 7,378,543 B2
(45) Date of Patent: May 27, 2008

(54) STABLE LIQUID BIURET MODIFIED AND BIURET ALLOPHANATE MODIFIED TOLUENE DIISOCYANATES, PREPOLYMERS THEREOF, AND PROCESSES FOR THEIR PREPARATION

(75) Inventors: William E. Slack, Moundsville, WV (US); Rick L. Adkins, Hurricane, WV (US); Hersel T. Kemp, New Martinsville, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 437 days.

(21) Appl. No.: 10/626,368

(22) Filed: Jul. 24, 2003

(65) Prior Publication Data

US 2005/0020765 A1 Jan. 27, 2005

(51) Int. Cl.
*C07C 263/00* (2006.01)
*C07C 273/00* (2006.01)
(52) U.S. Cl. .................................... 560/339; 560/335
(58) Field of Classification Search ............. 560/330, 560/335
See application file for complete search history.

(56) References Cited

U.S. PATENT DOCUMENTS

| | | | | |
|---|---|---|---|---|
| 3,367,956 A | | 2/1968 | Hennig et al. ............... 260/453 |
| 3,862,973 A | * | 1/1975 | Dietrich et al. .............. 560/335 |
| 3,903,126 A | * | 9/1975 | Woerner et al. .............. 560/335 |
| 4,456,709 A | | 6/1984 | Richter et al. ............... 521/160 |
| 4,618,706 A | | 10/1986 | Scholl et al. ................ 560/335 |
| 4,677,136 A | | 6/1987 | Rasshofer et al. ........... 521/159 |
| 4,703,100 A | | 10/1987 | Rasshofer et al. ............. 528/66 |
| 4,837,359 A | | 6/1989 | Woynar et al. .............. 560/335 |
| 5,212,275 A | | 5/1993 | Slack et al. .................... 528/67 |
| 5,219,975 A | | 6/1993 | Schmalstieg et al. ......... 528/45 |
| 5,282,988 A | * | 2/1994 | Farng et al. ................. 508/386 |
| 5,310,053 A | | 5/1994 | Lowry et al. ................ 206/310 |
| 5,310,054 A | | 5/1994 | Stumpff et al. .............. 206/310 |
| 5,428,124 A | | 6/1995 | Slack et al. .................... 528/60 |
| 5,440,003 A | | 8/1995 | Slack .......................... 528/48 |
| 5,880,174 A | | 3/1999 | Singh et al. ................. 523/142 |
| 5,994,491 A | | 11/1999 | Woynar et al. ................ 528/68 |
| 6,028,158 A | | 2/2000 | Slack et al. .................... 528/44 |
| 6,063,891 A | | 5/2000 | Slack et al. .................... 528/59 |
| 6,271,279 B1 | | 8/2001 | Nodelman et al. .......... 521/159 |

FOREIGN PATENT DOCUMENTS

| | | |
|---|---|---|
| DE | 197 07 577 | 8/1998 |
| EP | 0 211 630 A2 | 2/1987 |
| GB | 1 321 930 | 7/1973 |
| JP | 62256893 | * 11/1987 |

OTHER PUBLICATIONS

Wagner, W.: "Dr." Angew. Chem., vol. 74, No. 21, 1962, pp. 799-801, XP009042387.

* cited by examiner

*Primary Examiner*—Karl Puttlitz
(74) *Attorney, Agent, or Firm*—Lyndanne M. Whalen; N. Denise Brown

(57) ABSTRACT

This invention relates to stable liquid biuret modified toluene diisocyanates, prepolymers thereof, stable liquid biuret allophanate modified toluene diisocyanates, prepolymers thereof, and to processes for the preparation of these compositions. The stable liquid biuret modified toluene diisocyanates comprise a secondary amine based biuret modified TDI having an NCO group content of about 12 to about 46% by weight.

11 Claims, No Drawings

STABLE LIQUID BIURET MODIFIED AND BIURET ALLOPHANATE MODIFIED TOLUENE DIISOCYANATES, PREPOLYMERS THEREOF, AND PROCESSES FOR THEIR PREPARATION

BACKGROUND OF THE INVENTION

This invention relates to stable liquid biuret modified toluene diisocyanates, prepolymers thereof, stable liquid biuret allophanate modified toluene diisocyanates, prepolymers thereof, and to processes for the preparation of these compositions. The stable liquid biuret modified toluene diisocyanates comprise a secondary amine based biuret modified TDI having an NCO group content of about 16 to about 46% by weight.

Modified isocyanates, including aromatic diisocyanates are known and described in the art. Various modifications include, for example, allophanate modified, biuret modified, carbodiimide modified, isocyanurate modified, uretdione modified, urethane modified, oxadiainetrione modified and various combinations thereof.

Biuret modified diisocyanates including those based on aromatic diisocyanate and prepolymers thereof, are known and described in, for example, U.S. Pat. Nos. 4,618,706, 4,677,136, 4,703,100, 4,837,359, 5,212,275, 5,428,124 and 5,994,491.

More specifically, U.S. Pat. Nos. 4,667,136 and 4,703,100 describe urea and/or biuret group containing polyisocyanates prepared by reacting an organic polyisocyanate and a high molecular weight (500 to 20,000) polyether or polyester containing at least two isocyanate-reactive groups which may be primary and/or secondary hydroxyl and/or amine groups and mixtures thereof), and optionally, a low molecular weight compound comprising one or more of aromatic diamines or triamines, (cyclo)aliphatic diamines of triamines, organic compounds containing at least one hydroxyl group and at least one amine group, organic compounds containing at least two alcoholic hydroxyl groups (and optionally an ether or ester group), and a hydrazine containing at least two reactive NH groups. Processes for the preparation of these urea and/or biuret modified isocyanates are also disclosed.

U.S. Pat. No. 4,837,359 discloses biurets prepared from a (cyclo)aliphatic diisocyanate and a (cyclo)aliphatic primary diamine compound. Biurets based on aromatic diisocyanates and diamines having aromatically attached amino groups and processes for their preparation are described by U.S. Pat. Nos. 4,618,706 and 5,994,491.

Urea and biuret prepolymers of diphenylmethane diisocyanates are known and described in U.S. Pat. Nos. 5,212,275 and 5,428,124. U.S. Pat. No. 5,212,275 describes liquid prepolymers of ureas and/or biurets prepared by reacting a polyfunctional secondary amine group containing compound corresponding to a specific structure with a polyisocyanate of the diphenylmethane series. Storage stable, liquid prepolymers of MDI containing urea and/or biuret groups are disclosed in U.S. Pat. No. 5,428,124. These are prepared by reacting an aminocrotonate with a mixture of MDI having a specified isomer distribution.

Allophanate modified diphenylmethane diisocyanates, prepolymers thereof, etc. are known and described in, for example, U.S. Pat. Nos. 5,310,053 and 5,310,054. The liquid stable products of U.S. Pat. No. 5,319,053 are characterized by an NCO group content of 12 to 32.5%, and comprise the reaction product of an aliphatic alcohol and a specified mixture of isomers of diphenylmethane diisocyanate. This reference also discloses stable liquid MDI prepolymers which comprise the reaction product of the allophanate-modified MDI as described above, with an organic material containing two or more active hydrogen groups. U.S. Pat. No. 5,319,054 describes liquid allophanate modified MDI compositions which are storage stable at 25° C. The diphenylmethane diisocyanate has a specific isomer distribution requiring 2 to 60% by weight of 2,4'-diphenylmethane diisocyanate.

Allophanate modified diphenylmethane diisocyanate prepolymers are described in U.S. Pat. No. 5,440,003. These products are stable liquids at 25° C., and comprise the reaction product of an isomeric mixture of diphenylmethane diisocyanate and an aromatic alcohol such as phenol, with the resultant product being converted to the allophanate having an NCO group content of 12 to 32% by weight.

U.S. Pat. No. 6,271,279 discloses flexible foams prepared from toluene diisocyanate diol allophanates and the process for the preparation of flexible foams from these. These allophanate modified polyisocyanates are liquids and storage stable, and characterized by an NCO group content of about 20 to 42%.

U.S. Pat. Nos. 6,028,158 and 6,063,891 are directed to freeze-stable allophanate modified toluene di- or poly-isocyanate partial trimers; to freeze-stable blends of these allophanate modified toluene di- or polyisocyanate partial trimers with polymethylene poly(phenylisocyanates); to freeze-stable urethane prepolymers of these allophanate modified, partially trimerized toluene di or polyisocyanates; to freeze-stable blends of the urethane prepolymers of the allophanate modified, partially trimerized toluene di- or polyisocyanates with polymethylene poly(phenylisocyanates); and to processes for the preparation of these products.

Another trimer of toluene diisocyanate is disclosed in U.S. Pat. No. 4,456,709. These are also described as being liquid and storage stable at room temperature. The polyisocyanates of the '709 patent are mixtures characterized by an NCO group content of 36.5 to 45% by wt., and consist essentially of (a) 25 to 70 parts by wt. of a mixture having an NCO group content of 22 to 36% by wt. of (i) isocyanurate group containing trimers of 2,4-diisocyanatotoluene and (ii) 2,4-diisocyanateotoluene, and (b) from 30 to 75 parts by wt. of 2,4- and/or 2,6-diisocyanatotoluene.

Advantages of the present invention include stable liquid products having unique structures and higher functionalities than other biuret modified isocyanates, biuret-allophanate modiified isocyanates and prepolymers thereof. Higher functionalities are expected to result in faster cure rates in foams.

SUMMARY OF THE INVENTION

This invention relates to stable, liquid biuret modified toluene diisocyanates comprising a secondary amine based biuret modified toluene diisocyanate having an NCO group content of about 16 to about 46% and preferably about 20 to 40% by wt., and to a process for the preparation of these biuret modified toluene diisocyanates.

These stable, liquid biuret modified toluene diisocyanates comprise:
   (a) a secondary monoamine group containing compound which may be aliphatic, aromatic or araliphatic; and
   (b) toluene diisocyanate having an NCO group content of about 48.3% and comprising:
      (i) from 0 to 40% by weight of 2,6-toluene diisocyanate, and (ii) from 60 to 100% by weight of 2,4-toluene diisocyanate,
wherein the %'s by weight of (b)(i) and (b)(ii) total 100% by weight of (b).

The process for the preparation of these stable liquid biuret modified toluene diisocyanates comprises:
(1) reacting
  (a) a secondary monoamine group containing compound which may be aliphatic, aromatic or araliphatic; and
  (b) toluene diisocyanate having an NCO group content of about 48.3% as described above, in the presence of
  (c) at least one allophanate catalyst.

The present invention also relates to a stable liquid biuret allophanate modified toluene diisocyanates having an NCO group content of 16 to 46% and preferably 20 to 40% by weight, and to a process for their preparation. The stable liquid biuret allophanate modified toluene diisocyanates comprise:
  (a) a secondary monoamine group containing compound which may be aliphatic, aromatic or araliphatic;
  (b) toluene diisocyanate having an NCO group content of about 48.3% and comprising:
    (i) from 0 to 40% by weight of 2,6-toluene diisocyanate, and
    (ii) from 60 to 100% by weight of 2,4-toluene diisocyanate,
    wherein the %'s by weight of (b)(i) and (b)(ii) total 100% by weight of (b), and
  (d) an aromatic alcohol or an aliphatic alcohol.

The process of preparing these stable liquid biuret allophanate modified toluene diisocyanates comprises:
(1) reacting
  (a) a secondary monoamine group containing compound which may be aliphatic, aromatic or araliphatic;
  (b) toluene diisocyanate having an NCO group content of about 48.3% as described above and
  (c) an aromatic alcohol or an aliphatic alcohol, in the presence of
  (d) at least one allophanate catalyst.

Another aspect of the present invention includes the stable liquid prepolymers of biuret modified toluene diisocyanates having an NCO group content of about 6 to about 44% and preferably about 16 to 36% by weight, and the process of their preparation. These stable liquid prepolymers of biuret modified toluene diisocyanates comprise:
  (A) the stable liquid biuret modified toluene diisocyanates as described above, and
  (B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof.

The process for the preparation of these stable liquid prepolymers of biuret modified toluene diisocyanate having an NCO group content of about 6 to about 44% and preferably 16 to 36% by wt., comprises:
(1) reacting:
  (A) the stable liquid biuret modified toluene diisocyanate having an NCO group content of 16 to 46% by wt. as described above, with
  (B) an isocyanate-reactive component selected from the group consisting of (1) one or more diols having a molecular weight of 76 to 200, (2) one or more polyether polyols having a molecular weight of 300 to 6000 and containing from about 1.5 to about 6 hydroxyl groups and (3) mixtures thereof,
  wherein the temperature is from about 40 to about 80° C., preferably from about 60 to about 65° C., for about 1 to 4 hours, preferably for about 2 hours.

The present invention is also directed to stable liquid prepolymers of biuret allophanate modified toluene diisocyanates having an NCO group content of 6 to 44% and preferably 16 to 36% by wt., and to a process for their preparation. These stable liquid prepolymers of biuret allophanate modified toluene diisocyanate comprise:
  (C) the stable liquid biuret allophanate modified toluene diisocyanate as described above, and
  (B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof.

The process for preparing these stable liquid prepolymers of the biuret allophanate modified toluene diisocyanates comprises:
(1) reacting:
  (C) the stable liquid biuret allophanate modified toluene diisocyanate as described above, with
  (B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof,
  wherein the temperature is from about 40 to about 80° C., preferably from about 60 to about 65° C., for about 1 to 4 hours, preferably for about 2 hours.

DETAILED DESCRIPTION OF THE INVENTION

Suitable secondary monoamine group containing compounds include those aliphatic monoamine, aromatic monoamine and/or araliphatic monoamine group containing compounds, and preferably have molecular weights of from about 45 to about 600. These compounds most preferably have molecular weights of from about 45 to about 250. More specifically, suitable secondary monoamines useful herein to form biurets in accordance with the present invention include those which correspond to the general formula:

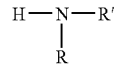

wherein:
R: represents a hydrocarbyl moiety selected from alkyl and cycloalkyl, radicals, and
$R^1$ represents a hydrocarbyl moiety selected from alkyl, cycloalkyl, arakyl, and aryl radicals,
wherein R and $R^1$ may be the same or different moieties.

In general, suitable alkyl and cycloalkyl radicals contain from 1 to 18 carbon atoms, and preferably from 3 to 8 carbon atoms. The useful aralkyl and aryl radicals typically contain from 6 to 16 carbon atoms, and preferably from 6 to 10 carbon atoms. These hydrocarbyl moieties can also contain groups that do not react with isocyanates, e.g. ether groups and halogens such as chloride and bromide. The secondary monoamines used in the present invention should be free of any other group which is reactive with isocyanate groups. Some examples of suitable secondary monoamines for the present invention include, but are not limited to, ibutylamine, diisopropylamine, dioctylamine, butylethyl amine, N-ethylaniline, N-methyl-2-chloroaniline, and N-ethyl-o-toluidine. Preferred monoamines are the isomeric dipropyl-dibutyl-, dipentyl-, dihexyl-, and dioctyl-amines.

Suitable toluene diisocyanates for the present invention inlcude those having NCO group contents of about 48.3% by weight, and which comprise: (i) from 0 to 40%, preferably from 20 to 35% by weight, of 2,6-toluene diisocyanate, and (ii) from 60 to 100% by weight, preferably from 65 to 80% of 2,4-toluene diisocyanate, wherein the %'s by weight of (i) and (ii) totals 100% by weight of the toluene diisocyanate component.

Suitable alcohols useful herein for forming biuret allophanate modified toluene diisocyanates include aliphatic alcohols and aromatic alcohols. Generally, suitable aliphatic alcohols preferably contain from 1 to 36 carbon atoms, and most preferably from about 4 to about 8 carbon atoms. Illustrative but nonlimiting examples of the suitable aliphatic alcohols can be selected from the group consisting of cycloaliphatic alcohols, aliphatic alcohols which may additionally contain groups that do not react with isocyanates, such as, for example, ether groups, halogens such as chloride and bromine, etc. Some examples of specific alcohols suitable for this invention include isobutyl alcohol, cetylalcohol, cyclohexanol, 2-methoxyethanol and 2-bromoethanol. Suitable aromatic alcohols for this aspect of the present invention typically contain preferably from 5 to 20 carbon atoms, and most preferably from 6 to 9 carbon atoms. Examples of suitable aromatic alcohols include compounds such as phenol, the cresols, the xylenols and the trimethylphenols.

In accordance with the present invention, suitable allophanate catalyts include zinc acetylacetonate, zinc 2-ethylhexanoate, cobalt 2-ethylhexyloate, cobalt naphthenate, lead linoresinate, etc. A preferred allophanate catalyst is zinc acetylacetonate.

When a catalyst stopper is desired or necessary, a compound which is an acidic material is typically used. Suitable examples of catalyst stoppers include arihydrous hydrochloric acid, sulfuric acid, bis(2-ethylhexyl) hydrogen phosphate, benzoyl chloride, Lewis acids, etc. In general, the amount of stopper added is such that there is at least 1 equivalent of acid for each mole of the allophanate catalyst.

In forming the prepolymers of the biuret modified toluene diisocyanates and the prepolymers of the biuret allophanate modified toluene diisocyanates, suitable isocyanate-reactive components include those selected from the group consisting of (1) one or more diols having a molecular weight of from about 76 to about 200, (2) one or more polyether polyols having a molecular weight of from about 300 to about 6000 and containing from about 1.5 to about 6 hydroxyl groups and (3) mixtures thereof. These yield urethane prepolymers having an NCO group content of from about 6 to about 44%, preferably from about 16% to about 36%.

Suitable diols to be used for the preparation of prepolymers include, for example, compounds such as 1,3-butanediol, 1,2- and/or 1,3-propylene glycol, 2,2,4-trimethyl-1,3-pentanediol, 2-methyl-1,3-propanediol, dipropylene glycol, tripropylene glycol, diethylene glycol, triethylene glycol, etc. Preferred diols include 1,3-butanediol, 1,2-propylene glycol, dipropylene glycol, tripropylene glycol, and mixtures thereof.

Suitable polyether polyols for the preparation of prepolymers include, for example, those having hydroxyl functionalities of from about 1.5 to about 6, preferably from about 1.8 to about 3, and molecular weights of from about 300 to about 6,000, preferably from about 400 to about 4,800. These polyether polyols are prepared by, for example polymerizing tetrahydrofuran or epoxides such as, for example, ethylene oxide, propylene oxide, butylene oxide, styrene oxide or epichlorohydrin in the present of suitable catalysts such as, for example, $BF_3$ or KOH, or by chemically adding these epoxides, in admixtu res or successively to components containing reactive hydrogen atoms such as water, alcohols or amines. Some examples of suitable starters for these polyether polyols include the low molecular weight chain extenders set forth hereinabove as diols as well as compounds such as propylene glycol, glycerin, ethylene glycol, triethanolamine, water, trimethylolpropane, bisphenol A, sucrose, aniline, ammonia, ethanolamine, ethylene diamine, etc.

As used herein, the term "liquid" means that the product (or material) does not precipitate solids when stored at 25° C. for 3 months. By the term "stable" as used herein, it is meant that the product has up to 1% absolute change in the NCO group content and up to 10% change in the viscosity when stored at 25° C. for 3 months.

The process of preparing the stable liquid biuret modified toluene diisocyanate comprises first reacting the toluene diisocyanate with a suitable secondary monoamine at temperatures of about 40 to about 90° C. to form the urea, which is subsequently converted to the biuret with the use of an allophanate catalysts at temperatures of about 50 to about 110° C., for a reaction time of between 1 and 8 hours, preferably 1 to 5 hours. Lower temperatures in the catalysis step result in higher functionality of the resultant product (i.e. biuret modified TDI). Similarly, the process of preparing the stable liquid biuret-allophanate modified toluene diisocyanate comprises first reacting the toluene diisocyanate with a mixture of a suitable secondary monoamine and a suitable aromatic/aliphatic alcohol at temperatures of about 40 to about 90° C. to form the urea-urethane, which is subsequently converted to the biuret-allophanate with the use of an allophanate catalyst at temperatures of about 50 to about 110° C., for reaction times ranging between 1 and 8 hours. Lower temperatures in the catalysis step result in higher functionality of the resultant product (i.e. biuret-allophanate modified TDI). After the biuret and/or biuret-allophanate reaction is complete, an acidic stopper is added.

In an alternate process for preparing the biuret and/or the biuret-allophanate modified TDI, the reactants as described above (TDI and secondary monoamine for the biuret; and TDI, secondary monoamine and aromatic/aliphatic alcohol for the biuret-allophanate) are reacted in one step with the allophanate catalyst to form the biuret modified or the biuret-allophanate modified toluene diisocyanate. Once the conversion is complete, which requires from about 1 to about 8 hours (preferably from about 1 hour to about 5 hours) at temperatures of from about 50 to about 110° C., an acidic material which acts as a stopper for the allophanate catalyst is added. As above, lower temperatures in the catalysis step result in higher functionality of the resultant product (i.e. the biuret and/or the biuret-allophanate modified TDI).

Stable liquid prepolymers of the biuret modified toluene diisocyanate and stable liquid prepolymers of the biuret-allophanate modified toluene diisocyanates are prepared, respectively, from the biuret modified TDI and the biuret-allophanate modified TDI described (and prepared) above (including the addition of an acidic material as a catalyst stopper), by reacting the biuret modified TDI or the biuret-allophanate modified TDI with a suitable polyether polyol or a suitable diol at temperatures ranging from about 40 to about 80° C. (preferably from about 60 to about 65° C.) for about 1 to about 4 hours (preferably for about 2 hours).

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

As used herein, the molecular weights referred to are number average molecular weights ($M_n$) and are determined by end group analysis (OH number). By the term "Isocyanate Index" (also commonly referred to as NCO index), is defined herein as the equivalents of isocyanate, divided by the total equivalents of isocyanate-reactive hydrogen containing materials, multiplied by 100.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following materials were used in the working examples for the preparation of the biuret and biuret-allophanate modified toluene diisocyanate.

TD-80: Toluene diisocyanate, which contains 80% by weight 2,4-isomer and 20% by weight 2,6-isomer.
DBA: Di-butylamine
NEA: N-Ethylaniline
Catalyst A: Zinc Acetylacetonate Example 1

100 parts of TD-80 and 10 parts DBA were added to a stirred reactor having a nitrogen purge. 0.015 part Catalyst A was added and the mixture was heated at 90° C. for 2 hours followed by the addition of 0.03 part benzoyl chloride. The reaction mixture was cooled to 25° C. to give a clear yellow biuret modified TD-80 having an NCO content of 36.7% and a viscosity at 25° C. of 19 mPa·s.

Example 2

Example 1 was repeated using 100 parts TD-80 and 9.4 parts NEA to give a biuret modified TD-80 having an NCO content of 38.7% and a viscosity at 25° C. of 9 mPa·s.

The following materials were used in the working examples for the preparation of the biuret prepolymers.
Iso A: Biuret modified TD-80 of Example 1.
Iso B: Biuret modified TD-80 of Example 2.
Polyether A: A propylene glycol/propylene oxide adduct having a molecular weight of 1000 and a functionality of about 2.
Polyether B: A propylene glycol/propylene oxide adduct having a molecular weight of 2000 and a functionality of about 2.
Polyether C: A propylene glycol/propylene oxide ethylene oxide adduct terminated with 20% by weight of ethylene oxide, and having a molecular weight of 4000 and a functionality of about 2.
Polyether D: A glycerine/propylene oxide/ethylene oxide adduct terminated with 17% by weight ethylene oxide having a molecular weight of 4800 and a functionality of about 3.

Example 3

78.8 parts Iso A were charged to a stirred reactor and 21.2 parts of Polyether B was added. The reaction mixture was held at 60° C. for 2 hours and then cooled to 25° C. The clear liquid prepolymer had an NCO content of 27.7% and a viscosity at 25° C. of 118 mPa·s.

Examples 4 through 10

Examples 4 through 10 used the process as described above for Example 3. The materials used and the percent NCO and viscosity obtained in Examples 3 through 10 are set forth in the following table.

TABLE 1

| Example | Iso | PBW Iso | Polyether | PBW Polyether | % NCO | Viscosity @ 25° C. mPa · s (cps) |
|---|---|---|---|---|---|---|
| 3 | A | 78.8 | B | 21.2 | 27.7% | 118 |
| 4 | A | 77.6 | C | 22.4 | 28.0% | 131 |
| 5 | A | 85.2 | A | 14.8 | 29.8% | 86 |
| 6 | A | 77.9 | D | 22.1 | 27.8% | 148 |
| 7 | B | 75.0 | B | 24.9 | 27.7% | 87 |
| 8 | B | 73.8 | C | 26.3 | 28.0% | 105 |
| 9 | B | 87.9 | A | 12.1 | 33.0% | 32 |
| 10 | B | 74.1 | D | 25.9 | 27.9% | 117 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable liquid biuret allophanate modified toluene diisocyanate having an NCO group content of 16 to 46% by weight, and comprising:
    (a) a secondary monoamine group containing compound which is selected from the consisting of aliphatic monoamine compounds, aromatic monoamine compounds and araliphatic monoamine compounds;
    (b) toluene diisocyanate having an NCO group content of about 48.3% and comprising:
        (i) from 0 to 40% by weight of 2,6-toluene diisocyanate, and
        (ii) from 60 to 100% by weight of 2,4-toluene diisocyanate,
        wherein the %'s by weight of (b)(i) and (b)(ii) total 100% by weight of (b); and
    (c) an aliphatic or aromatic alcohol.

2. The stable liquid biuret allophanate modified toluene diisocyanate of claim 1, wherein the NCO group content ranges from 20 to 40% by weight.

3. The stable liquid biuret allophanate modified toluene diisocyanate of claim 1, wherein (a) said secondary monoamine group containing compound has a molecular weight of from about 45 to about 600.

4. The stable liquid biuret allophanate modified toluene diisocyanate of claim 1, wherein (b) said toluene diisocyanate comprises:
 (i) from about 20 to about 35% by weight of 2,6-toluene diisocyanate, and
 (ii) from about 65 to about 80% by weight of 2,4-toluene diisocyanate,
 wherein the %'s by weight of (b)(i) and (b)(ii) total 100% by weight of (b).

5. The stable liquid biuret allophanate modified toluene diisocyanate of claim 1, wherein (c) said aliphatic alcohol has from 1 to 36 carbon atoms and said aromatic alcohol has from 5 to 20 carbon atoms.

6. A stable liquid prepolymer of biuret modified toluene diisocyanate having an NCO group content of about 6 to about 44% by weight, comprising
 (A) a stable liquid secondary amine based biuret modified toluene diisocyanate having an NCO group content of 16 to 46% by weight, which comprises the reaction product of
  (a) an aliphatic monoamine compound which is selected from the group consisting of dipropylamine, dibutylamine, dipentylamine, dihexylamine and dioctylamine; and
  toluene diisocyanate having an NCO group content of about 48.3% by weight comprising (i) from 0 to 40% by weight of 2,6-toluene diisocyanate, and (ii) from 60 to 100% by weight of 2,4-toluene diisocyanate, with th %'s by weight of (b)(i) and (b)(ii) totaling 100% by weight of (b); and
 (B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof.

7. The stable liquid prepolymer of claim 6, wherein the NCO group content ranges from about 16 to about 36% by weight.

8. The stable liquid prepolymer of claim 6, wherein (B)(1) diols are selected from the group consisting of 1,3-butanediol, 1,2-propylene glycol, dipropylene glycol, tripropylene glycol and mixtures thereof, and (B)(2) said polyether polyols have molecular weights of from about 400 to about 4,800 and functionalities of from about 1.8 to about 3.

9. A stable liquid prepolymer of biuret allophanate modified toluene diisocyanate having an NCO group content of 6 to 44% and comprising:
 (C) the stable liquid biuret allophanate modified toluene diisocyanate of claim 1; and
 (B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof.

10. The stable liquid prepolymer of biuret allophanate modified toluene diisocyanate of claim 9, wherein the NCO group content is from about 16 to about 36% by weight.

11. The stable liquid prepolymer of biuret allophanate modified toluene diisocyanate of claim 9, wherein (B)(1) diols are selected from the group consisting of 1,3-butanediol, 1,2-propylene glycol, dipropylene glycol, tripropylene glycol and mixtures thereof, and (B)(2) said polyether polyols have molecular weights of from about 400 to about 4,800 and functionalities of from about 1.8 to about 3.

* * * * *